June 22, 1965     J. E. GILBERTSON     3,190,061

LAWNMOWER DEVICE

Filed Nov. 4, 1963

INVENTOR
JOHN E. GILBERTSON
BY
Duck & Zarley
ATTORNEYS

United States Patent Office 3,190,061
Patented June 22, 1965

3,190,061
LAWNMOWER DEVICE
John E. Gilbertson, 3209 Douglas Ave., Des Moines, Iowa
Filed Nov. 4, 1963, Ser. No. 321,113
6 Claims. (Cl. 56—25.4)

This invention relates to lawnmowers and more particularly to guard attachments for power operated lawnmowers.

Power operated rotary lawnmowers are commonplace today and have been so for some time. A series hazard exists in the operation of these lawnmowers in that they are very dangerous. A great many accidents occur to operators of these lawnmowers by reason of coming into contact with the rotary cutting blade. This contact between the operator and the cutting blade usually occurs when the toes or foot of the operator passes beneath the cutting blade housing thereby contacting the cutting blade. These accidents usually occur when the lawnmower is being pulled backwardly or when the operator falls down and the lawnmower rolls backwardly towards him.

These injuries are usually made more serious in that after contact with the cutting blade is initially established the blade continues to rotate in its deadly path. The operator being entangled with the cutting blade is usually unable to shut off the engine of the lawnmower. Injuries also occur to the lawnmower operator when the cutting blade strikes an object and throws it backwardly towards the operator. Objects such as wire, rocks, nails, etc. are commonly striking the operator's legs and feet sometimes causing serious injury.

Therefore a principal object of the invention is to provide a device which eliminates the possibility of serious accidents.

A further object of the invention is to provide an emerging engine shut-off means.

A still further object of the invention is to provide a device which will prevent injury to the lawnmower operator without hindering the operation of the lawnmower.

A still further object of the invention is to provide a device which will prevent objects which are thrown by the cutting blade from striking the lawnmower operator.

A still further object of the invention is to provide a device which will prevent any portion of the operator's body from extending within the cutting blade housing of a lawnmower.

A still further object of the invention is to provide a device which is economical of manufacture, durable in use, and refined in appearance.

These and other objects will be apparent to one skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

Figure 1:
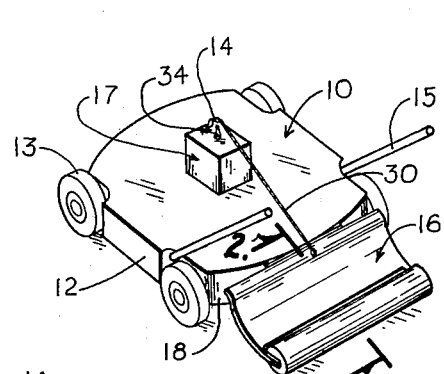
FIG. 1 is a fragmentary perspective view of a lawnmower with a guard attachment secured thereto.
Figure 2:
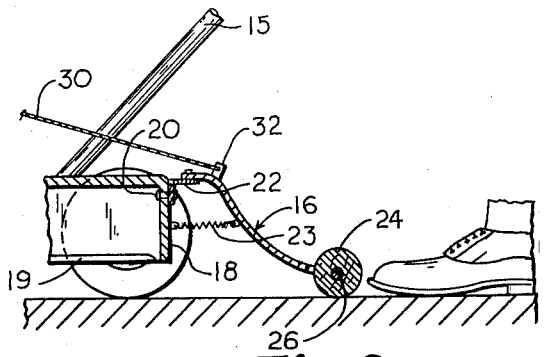
FIG. 2 is a sectional view of the device as seen on line 2—2 of FIG. 1 at an enlarged scale.

I have used the numeral 10 to generally designate a lawnmower having a cutting blade housing 12 supported by a plurality of wheels 13 rotatably mounted thereon and a power means 17 rigidly mounted on the top surface of housing 12. A spark plug 34 is threadably secured to power means 17. A drive shaft 21 extends downwardly from power means 17 and has a cutting blade 19 secured to its lower end. A handle device 15 is secured at its lower end to housing 12.

A guard attachment 16 is hingedly secured to the backward end 18 of housing 12 by means of bolts 20 extending through hinge 22. A spring 23 extends from the bottom side of guard 16 to the backward end 18 of housing 12.

An elongated roller 24 is rotatably secured to guard 16 by means of pin 26 extending from both ends of roller 24 through a hole in arms 28 which extends rearwardly from guard 16 adjacent its rearward outer edges. A cable 30 extends from bracket 32 on guard 16 to power shut-off means 14 which is secured to power means 17. Shut-off means 14 is comprised of a flexible member adapted to ground spark plug 34 on lawnmower 10 when said flexible member is dispressed until coming into contact with spark plug 34.

Figure 4:
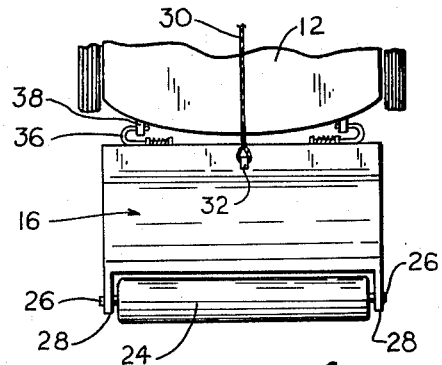
FIG. 4 is a fragmentary top plan view of a modified form of the device.

An alternate method of hingedly securing guard 16 to cutting blade housing 12 is by means of a pair of spring loaded hinge pins 36 secured to guard 16 and extending through brackets 38 secured to the backward side 18 of housing 12. This hinge device is illustrated in FIG. 4 of the drawings.

Figure 3:
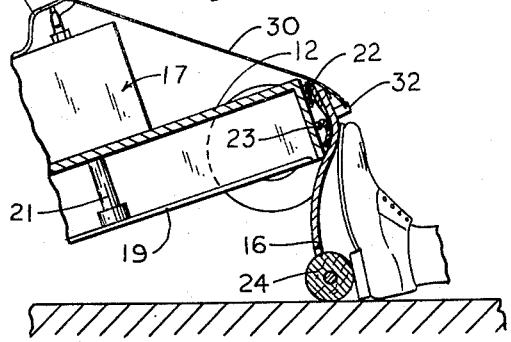
FIG. 3 is a sectional view of the device as seen on line 2—2 of FIG. 1 at an enlarged scale showing the mower in a tilted position.
Figure 5:
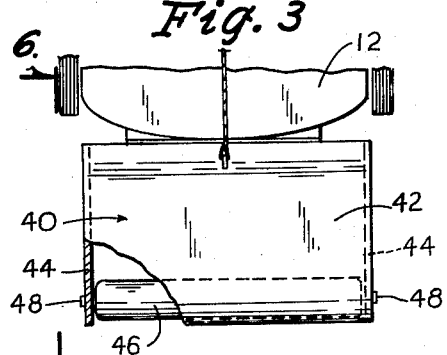
FIG. 5 is a fragmentary sectional plane view of a further modification of the device with a portion of the guard attachment cut away to more fully illustrate the device.
Figure 6:
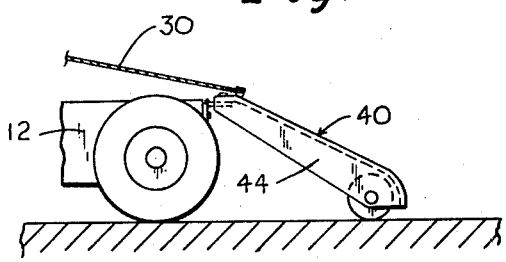
FIG. 6 is a fragmentary sectional side view of the device as viewed on line 6—6 of FIG. 5.

An alternate method of constructing a guard attachment while continuing to utilize the same general principle is illustrated in FIGS. 5 and 6. In these figures the numeral 40 designates a guard attachment having a shell 42 and vertically disposed side portions 44. An elongated roller 46 similar to roller 24 is rotatably secured to the vertically disposed side portions 44 within guard attachment 40 by means of pins 48 extending from both ends of roller 46 through the side portions 44 adjacent their rearward end. Guard attachment 40 is hingedly secured to housing 12 in an identical fashion to that of guard 16. A cable 30 extends from bracket 32 on guard 40 to a power shut-off means similar to that illustrated in FIGS. 1 and 3.

Figure 7:
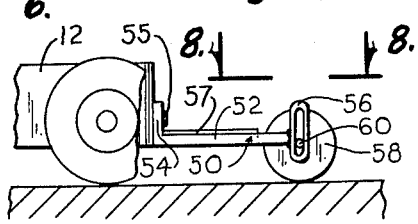
FIG. 7 is a fragmentary elevational side view of still a further modification of the device with a portion cut away to more fully illustrate the device.
Figure 8:
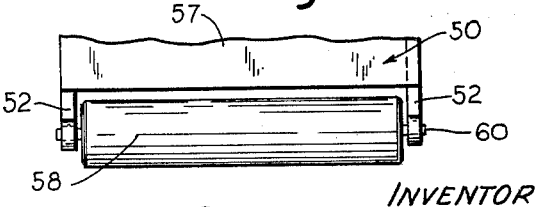
FIG. 8 is a sectional view of the device as viewed on line 8—8 of FIG. 7 at an enlarged scale.

Another alternate method of constructing a guard attachment is shown in FIGS. 7 and 8. In these figures the numeral 50 generally designates a guard attachment having a pair of elongated members 52 each of said members having a flange 54 extending at right angles from one end thereof. On the end opposite to flange 54 is a vertical slot means 56 secured to elongated members 52. Elongated members 52 are secured to the backward side 18 of housing 12 adjacent each of its outer edges by means of bolt 55 extending through flange 54 and housing 12. A plate 57 extends between elongated members 52 and is secured thereto in any convenient fashion. An elongated roller 58 is slidably rotatably secured to guard 50 by means of pin extending from both ends of roller 58 and extending through vertical slot means 56.

The normal method of operation of the device is as follows. The lawnmower 10 will be operated in the ordinary manner. Roller 24 which is rotatably secured to the rearward side of guard 16 will simply roll along the ground. Spring 23 yieldably holds said roller in a ground engaging position as well as the force of gravity. Guard attachment 16 will prevent any objects thrown by the cutting blade from striking the operator. The guard 16 will deflect all such objects into the ground. Roller 24 will prevent the toes or foot of the operator from extending beneath the housing 12. The roller 24 will prevent any portion of the operator from passing beneath it.

If the operator should fall down or becomes entangled with the cutting blade he merely needs to move guard attachment 16 in a downwardly direction. Cable 30 which is attached at one end to guard 16 and power shut-off means 14 at its other end will thereby depress the flexible member of the shut-off means and ground out the spark plug 34. This grounding of the spark plug will shut off the power means. Hinge 22 allows guard 16 to move upwardly or downwardly with respect to the lawnmower to compensate for uneven surfaces in the surface being mowed.

FIG. 4 illustrates an alternative method of hingedly securing the guard attachment 16 to the lawnmower. The hinge pins 36 are spring loaded and by merely pulling hinge pins 36 outwardly with respect to the lawnmower the pins will disengage from brackets 38 on housing 12.

An alternate method of constructing a guard attachment is shown in FIGS. 5 and 6. Guard attachment 40 differs from guard 16 in that side portions 44 are secured to a shell 42. These side portions further prevent any thrown objects from striking the operator or bystanders. In addition the roller 46 is rotatably secured within said guard attachment which prevents the operator from inadvertently stepping on the roller.

FIGS. 7 and 8 illustrate a further alternate method of constructing a guard attachment. The guard attachment 50 is rigidly secured to housing 12 but achieves the ability to compensate for uneven terrain by the roller being engaged in the vertical slot means 56. A plate 57 is secured to and extends between elongated members 52. Plate 52 prevents thrown objects from striking the operator while roller 58 prevents any portion of the operator's body from extending within the housing 12.

Thus it is obvious that the invention will accomplish at least all of its stated objectives.

Some changes may be made in the construction and arrangement of my lawnmower device without departing from the real spirit and purpose of my invention, and it is my intention to cover by my claims, any modified forms of structure or use of mechanical equivalents which may be reasonably included within their scope.

I claim:
1. In a lawnmower device,
   a lawnmower having a cutting blade housing supported by a plurality of wheels rotatably secured to said housing, an engine means rigidly secured to the top surface of said cutting blade housing, a drive shaft extending downwardly from said engine means through the top surface of said cutting blade housing having a cutting blade secured to its lower end, a handle operatively connected to said cutting blade housing, a spark plug threadably secured to said engine means, and an engine shut-off means on the top portion of said engine means,
   a guard attachment hingedly secured to the backward end of said lawnmower,
   an elongated roller rotatably secured to the backward end of said guard attachment,
   a cable secured to and extending from said guard attachment to said engine shut-off means of said lawnmower,
   a spring extending from the backward end of said lawnmower to said guard attachment yieldably holding said elongated roller in a ground engaging position,
   said engine shut-off means including a flexible member adapted to ground the spark plug of said engine means,
   said cable actuating said engine shut-off means when said guard attachment is moved downwardly with respect to said lawnmower thereby depressing said flexible member until said flexible member contacts and grounds said spark plug.
2. In a lawnmower device,
   a lawnmower having a cutting blade housing supported by a plurality of wheels rotatably secured to said housing, an engine means rigidly secured to the top surface of said cutting blade housing, a drive shaft extending downwardly from said engine means through the top surface of said cutting blade housing having a cutting blade secured to its lower end, a handle operatively connected to said cutting blade housing, a spark plug threadably secured to said engine means, and an engine shut-off means on the top portion of said engine means,
   a guard attachment hingedly secured at its forward end to the backward end of the cutting blade housing of said lawnmower,
   said guard attachment having a pair of vertically disposed side members,
   an elongated roller rotatably secured to said side members adjacent their backward ends;
   a cable secured to and extending from the outer surface of said guard attachment to said engine shut-off means on said lawnmower,
   said engine shut-off means including a flexible member adapted to move downwardly to ground the spark plug of said lawnmower,
   said cable actuating said engine shut-off means when said guard attachment is moved a pre-determined distance downwardly with respect to said lawnmower thereby depressing said flexible member until said member contacts and thereby grounds said spark plug,
   and a spring extending from the backward end of said blade housing to the lower side of said guard yieldably holding said roller in a ground engaging position.
3. The structure of claim 2 wherein a bracket is secured to each side of the backward end of said cutting blade housing and said guard attachment is hingedly secured to said lawnmower by means of spring loaded hinge pins secured to said guard attachment which are received by said brackets.
4. In a lawnmower device,
   a lawnmower having a cutting blade housing supported by a plurality of wheels rotatably secured to said housing, an engine means rigidly secured to the top surface of said cutting blade housing, a drive shaft extending downwardly from said engine means through the top surface of said cutting blade housing having a cutting blade secured to its lower end, a handle operatively connected to said cutting blade housing, a spark plug threadably secured to said engine means, and an engine shut-off means on the top portion of said engine means,
   a guard attachment hingedly secured at its forward end to the backward end of the cutting blade housing of said lawnmower,
   said guard attachment having a pair of vertically disposed side members,
   an elongated roller rotatably secured to said side members adjacent their backward end,
   a cable secured to and extending from the outer surface of said guard attachment to said engine shut-off means on said lawnmower,
   said engine shut-off means including a flexible member adapted to move downwardly to ground the spark plug of said lawnmower,
   said cable actuating said engine shut-off means when said guard attachment is moved a pre-determined distance downwardly with respect to said lawnmower thereby depressing said flexible member until said member contacts and thereby grounds said spark plug,
   and a spring extending from the backward end of said blade housing to the lower side of said guard yieldably holding said roller in a ground engaging position.
5. In a lawnmower device,
   a lawnmower having a cutting blade housing supported by a plurality of wheels rotatably secured to said housing, an engine means rigidly secured to the top surface of said cutting blade housing, a drive shaft extending downwardly from said engine means through the top surface of said cutting blade housing having a cutting blade secured to its lower end, a handle operatively connected to said cutting blade housing, a spark plug threadably secured to said engine means, and an engine shut-off means on the top portion of said engine means, a guard attachment hingedly secured to the backward end of said lawnmower, a cable secured to and extending from said guard attachment to said engine shut-off means of said lawnmower, a spring extending from the backward end of said lawnmower to said guard attachment yieldably holding said guard attachment in a ground engaging position, said engine shut-off means including a flexible member adapted to ground the spark plug of said engine means, said cable actuating said engine shut-off means when said guard attachment is moved downwardly with respect to said lawnmower thereby depressing said flexible member until said flexible member contacts and grounds said spark plug.

6. A lawnmower device, comprising in combination, a lawnmower having a cutting blade housing supported by a plurality of wheels rotatably secured to said housing, an engine means rigidly secured to the top surface of said cutting blade housing, a drive shaft extending downwardly from said engine means through the top surface of said cutting blade housing having a cutting blade secured to its lower end, a handle operatively connected to said cutting blade housing, a spark plug threadably secured to said engine means, and an engine shut-off means on the top portion of said engine means, a guard attachment hingedly secured to the backward end of said lawnmower, an elongated roller rotatably secured to the backward end of said guard attachment, a cable secured to and extending from said guard attachment to said engine shut-off means of said lawnmower, said engine shut-off means including a flexible member adapted to ground the spark plug of said engine means, said cable actuating said engine shut-off means when said guard attachment is moved downwardly with respect to said lawnmower thereby depressing said flexible member until said flexible member contacts and grounds said spark plug.

References Cited by the Examiner

UNITED STATES PATENTS

| 2,425,106 | 8/47 | Madsen | 56—249 X |
| 2,929,186 | 3/60 | Bundy | 56—25.4 |
| 2,963,842 | 12/60 | Estes | 56—25.4 |
| 2,973,613 | 3/61 | Hagedorn | 56—25.4 |
| 3,040,503 | 6/62 | Ogle | 56—25.4 |
| 3,106,812 | 10/63 | McDonagh | 56—25.4 |
| 3,111,800 | 11/63 | Quianthy | 56—25.4 |

FOREIGN PATENTS 221,479   5/59   Australia.

ANTONIO F. GUIDA, *Acting Primary Examiner.*

RUSSELL R. KINSEY, T. GRAHAM CRAVER,
*Examiners.*